United States Patent [19]
Strus

[11] Patent Number: 5,440,867
[45] Date of Patent: Aug. 15, 1995

[54] FRUIT PICKING DEVICE

[76] Inventor: Joseph A. Strus, Rte. 2, Box 409, Comanche, Okla. 73529

[21] Appl. No.: 227,674

[22] Filed: Apr. 14, 1994

[51] Int. Cl.$^6$ ............................................. A01D 46/00
[52] U.S. Cl. ...................................................... 56/332
[58] Field of Search ................................... 56/332–334, 56/328.1; 294/19.1–19.3, 68.1, 27.1, 33

[56] References Cited

U.S. PATENT DOCUMENTS

| | | |
|---|---|---|
| D. 297,499 | 9/1988 | Whitney . |
| 734,033 | 7/1903 | Alden . |
| 898,696 | 9/1908 | Southworth . |
| 2,180,077 | 9/1938 | Vote . |
| 2,243,106 | 4/1940 | Limbert . |
| 2,637,587 | 7/1952 | Robinson . |
| 3,109,276 | 11/1963 | Hachey . |
| 3,175,329 | 3/1965 | Beckman ........................... 56/332 |
| 4,959,949 | 10/1990 | Wier . |

FOREIGN PATENT DOCUMENTS 2234417  6/1991  United Kingdom .
117078  10/1956  U.S.S.R. .

Primary Examiner—Michael Powell Buiz
Attorney, Agent, or Firm—Head & Johnson

[57] ABSTRACT

A fruit picking device for removing a fruit from a tree or bush. The device includes a conical receptacle having an open base end and a compressible, resilient interior. The interior of the receptacle is compressible under the weight of the fruit and frictionally engages with the fruit. An elongated pole is in axial alignment with the conical receptacle wherein rotation of the receptacle rotates the fruit in order to separate the fruit from the tree or bush.

8 Claims, 3 Drawing Sheets

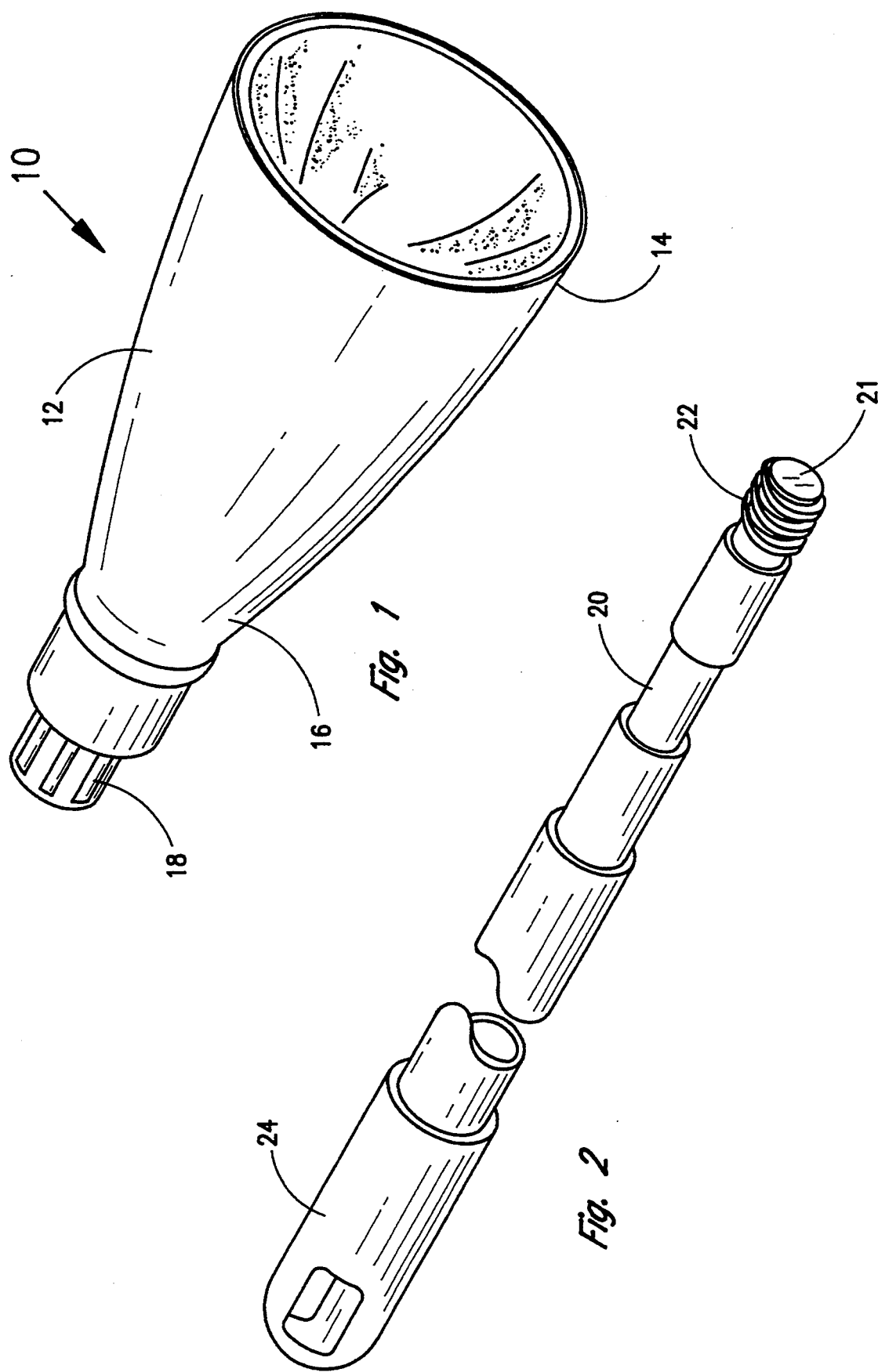

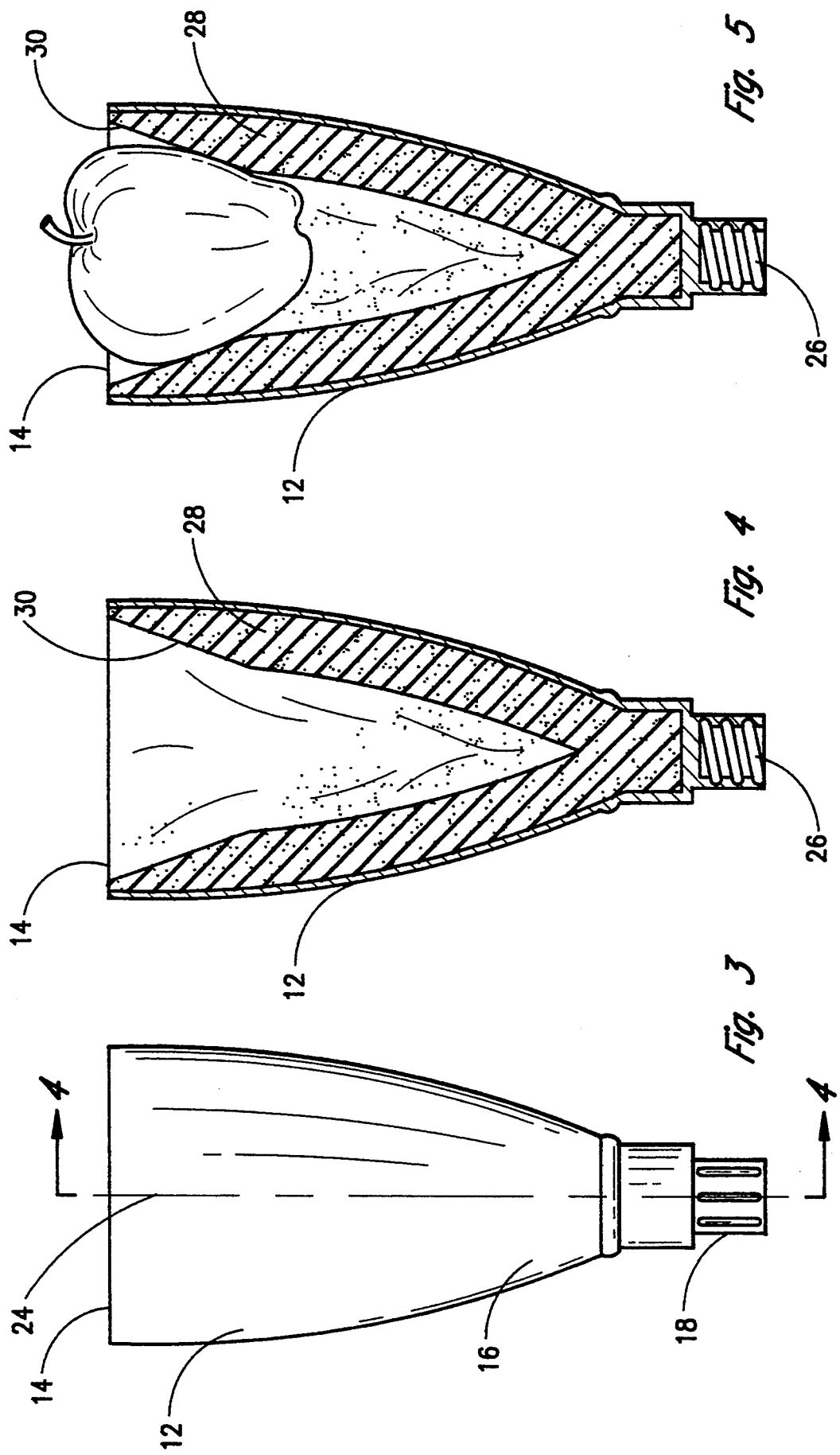

FRUIT PICKING DEVICE

BACKGROUND OF THE INVENTION

1. Field of the Invention

The present invention is directed to a fruit picking device to be used to remove a fruit from a tree or bush. In particular, the present invention is directed to a fruit picking device which will frictionally engage with a fruit to remove fruit beyond arms' reach.

2. Prior Art

Fruit picking devices to remove ripened fruit such as citrus fruit, apples, pears and the like have been proposed in various forms. In general, these devices are employed to allow removal of fruit from trees or bushes beyond the length of arms' reach.

The prior devices have suffered a number of limitations. Many are difficult to handle in order to grasp and retain the fruit. Another limitation is that many devices will bruise, mar or otherwise damage the fruit during the picking process. Further, in devices that pull the fruit from the branch of a tree or bush, other fruit may be knocked off in the process. One type of device employs a series of fingers to permit the stems or branches of a tree to pass therebetween. A pull or twist will dislodge the fruit to thereafter fall into the basket.

Certain other devices utilize a cone or conical receptacle such as Spalding (U.K. Patent 2,234,417) which includes a spiral rib extending from the internal surface. A plurality of grooves engage the stem of the fruit. A series of grooves or channels at the open end are used to cut or break the stem from the branch. As in other prior art devices, a cushion or cushioning is required to prevent the fruit from bruising.

There remains a need for a fruit picking device that will securely frictionally engage the fruit to be picked.

SUMMARY OF THE INVENTION

The present invention provides a fruit picking device including a generally conical receptacle having an open base end and a closed top end. The closed top end terminates in a connector which is attachable to one end of an elongated pole. The elongated pole will be attached in axial alignment with the conical receptacle. The elongated pole may be composed of telescoping sections with an outer, larger diameter section having a knob which may be loosen to allow movement between the sections.

The interior of the receptacle is provided with a means to frictionally engage the fruit to be separated from the tree or bush. A rubberized, sponge foam or similar material having the characteristics of compressibility and resiliency lines the entire interior of the conical receptacle. The foam material also has a high coefficient of friction so that the fruit will frictionally engage with the foam on the interior of the receptacle.

In order to remove fruit from a tree or bush, the pole is held by the operator and moved so that the open base end of the receptacle is brought underneath the fruit to be removed. The receptacle is then moved axially over the fruit so that the foam will be compressed by the weight of the fruit. The foam will frictionally engage with the exterior of various kinds of fruit.

Rotation of the pole will operate to rotate the receptacle. In turn, the fruit within the receptacle will rotate causing the fruit to separate from the stem or branch of the tree or bush.

BRIEF DESCRIPTION OF THE DRAWINGS

FIG. 1 is a perspective view of a conical receptacle which is a part of the fruit picking device of the present invention;

FIG. 2 is a perspective view of a portion of a pole which is an element of the fruit picking apparatus shown in FIG. 1;

FIG. 3 is an enlarged view of the conical receptacle shown in FIG. 1;

FIG. 4 is a sectional view taken along section line 4—4 of FIG. 3;

FIG. 5 is a sectional view taken along section line 4—4 of FIG. 3 with a fruit within the receptacle.

DETAILED DESCRIPTION OF THE PREFERRED EMBODIMENTS

Figure 6:
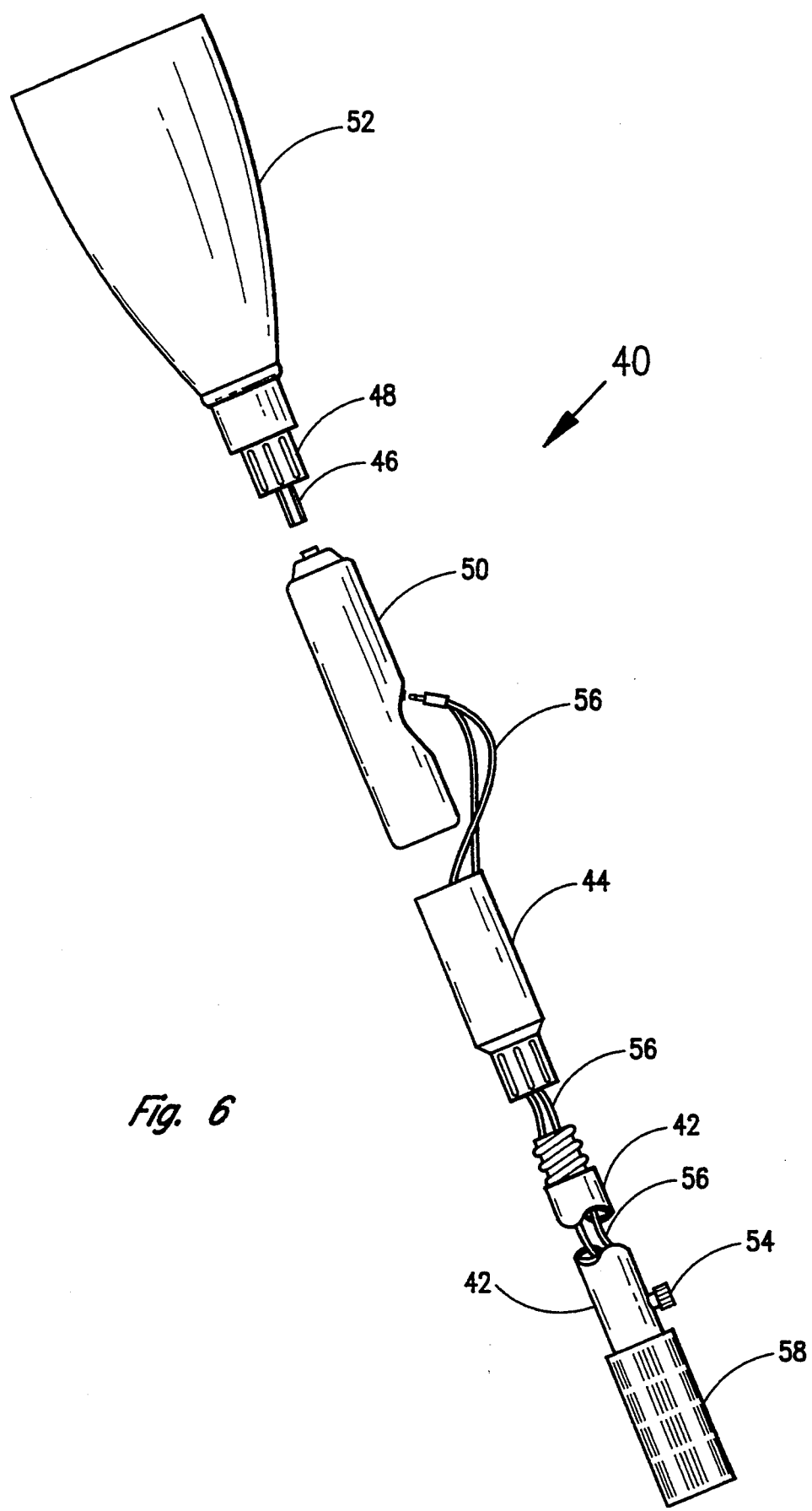
FIG. 6 is an alternate embodiment of the fruit picking device of the present invention.

FIGS. 1 and 2 illustrate one embodiment of a fruit picking device 10 with the elements separated from each other for clarity.

The device 10 includes a generally conical receptacle 12 having an open base end 14 and a closed top end 16. The open base end 14 is circular and vertical to the axis of the conical receptacle. The closed top end 16 terminates in a connector 18 having a threaded interior (not visible in FIG. 1). An elongated pole 20 will be attached in axial alignment with the conical receptacle 12 when the device is in use. A first end 21 of the pole having a threaded exterior 22 will be threadably attached to the threaded connector 18 so that a rigid connection is made therewith.

In the present embodiment, the pole 20 is composed of two or more telescoping sections with an outer, larger diameter section 24 having a knob which may be loosened to allow movement between the sections and tightened into place to secure the sections together. When not in use, the pole 20 will be reduced in length for transportation or storage.

FIG. 3 shows an external view of the receptacle 12, while FIG. 4 shows a sectional view taken along section line 4—4 of FIG. 3. The section line 24 is along the axis of the conical receptacle 12. The internal threads 26 of the threaded connector are visible.

The open base end 14 of the receptacle will be slightly larger than the diameter of the fruit to be picked. A plurality of interchangeable receptacles may be used. As an example, a receptacle having a larger diameter may be required for picking grapefruit. Conversely, a receptacle having a smaller diameter may be required for plums or apricots. One device, thus, may be used for a wide variety of fruit. FIG. 5 is a sectional view of the receptacle 12 showing a fruit lodged in the receptacle.

The receptacle 12 includes in its interior provision to frictionally engage the fruit to be separated from the tree or bush. A rubberized, sponge foam or a similar material 28 has the characteristics of being compressible and resilient and lines the entire interior of the conical receptacle 12. The foam material 28 also has a high coefficient of friction so that the fruit will frictionally engage with the foam material 28 on the interior of the receptacle. The material is compressed by the force of gravity on the fruit so it is not necessary to force the device upward to jam the fruit into the receptacle 12.

In the embodiment described herein, the foam material 28 is chamfered 30 at the open base end 14 of the receptacle. This allows for easy insertion of the fruit and engagement with the fruit and allows for acceptance of various size fruit.

In order to use the device to remove a fruit from a tree or bush, the pole 20 is threadably connected to the conical receptacle 12. The desired length of the pole 20 is established by moving the telescoping sections of the pole 20 with respect to each other and tightening the knob. The pole 20 is then held by the operator (not shown) and moved so that the open base end 14 of the receptacle 12 is brought underneath the fruit to be removed. As the receptacle 12 is moved over the fruit, the foam material 28 will be compressed by the weight of the fruit. In most cases, the receptacle 12 will move axially from the base of the fruit toward the top of the fruit although the receptacle will easily engage with the fruit in any position.

It is known that the fruiting habits of certain citrus trees are such that the fruit grows close to the branch without a long stem. The foam material 28 will frictionally engage with the exterior of various kinds of fruit including long stemmed fruit, such as pears and apples, as well as non-stemmed fruit, such as oranges and grapefruit. The fruit will not only be frictionally engaged with the receptacle, but will be supported therein.

Thereafter, the pole 20 will be rotated by the operator so that the receptacle 12 rotates. In turn, the fruit will rotate separating the stem or the fruit itself from the branch of the tree or bush. It will be seen that the fruit does not fall into a basket or container but is simply held snugly within the foam material 28.

If it is desirable to harvest a fruit of another size diameter, such as grapefruit, the existing receptacle can be unscrewed from the pole and replaced with a larger diameter receptacle.

FIG. 6 shows an alternate embodiment 40 of the present invention wherein a mechanism is provided to rotate the receptacle with respect to the elongated pole. The elements are exploded for clarity. The pole 42 terminates at one end in a holder bracket 44 which receives an electric motor 50.

The electric motor includes a rotating socket rotated by the electric motor. The receptacle 52 terminates in a connector 48 having an extending shaft 46. The shaft mates with the socket. An electric motor 50 is mounted in axial alignment with the elongated pole 42 within the bracket. The shaft 46 may have a hexagonal shape to mate with a hexagonal opening.

A switch 54, wired to the motor 50 via wire 56, will be located near the other end of the pole 42 opposite the receptacle in order to activate or deactivate the electric motor. In the present embodiment, a button switch is employed although it will be recognized that other types of switches may be used.

A rubber grip 58 may be provided at the other end of the pole 42.

In the motorized embodiment, once the fruit is within the receptacle 52 and frictionally engaged by foam material, the motor 50 is activated by the switch which causes the receptacle 52 to rotate. The rotation of the receptacle 52 rotates the fruit and, in turn, separates the stemmed fruit from the branch or separates the non-stemmed fruit from the branch.

Once the fruit is removed, the button switch is released. The fruit may then be removed from the receptacle.

Whereas, the present invention has been described in relation to the drawings attached hereto, it should be understood that other and further modifications, apart from those shown or suggested herein, may be made within the spirit and scope of this invention.

What is claimed is:

1. A fruit picking device for removing a fruit from a tree or bush, which device comprises:

a conical receptacle having an open base end, a compressible, resilient interior and an axially extending shaft;

means to frictionally engage said interior with one of said fruit;

a pole in axial alignment with said conical receptacle; and motor means to rotate said axially extending shaft of said receptacle with respect to said pole wherein rotation of said receptacle rotates said fruit.

2. A fruit picking device as set forth in claim 1 wherein said means to rotate said receptacle includes an electric motor mounted within said pole.

3. A fruit picking device as set forth in claim 2 wherein said receptacle is attached to said pole at one end and wherein switch means is located near said opposite end to activate and deactivate said electric motor.

4. A fruit picking device as set forth in claim 1 wherein said interior is lined with rubberized foam.

5. A fruit picking device as set forth in claim 4 wherein said rubberized foam is chamfered at said open base end.

6. A fruit picking device as set forth in claim 1 wherein said pole includes telescoping sections to extend the length or reduce the length of said pole.

7. A fruit picking device as set forth in claim 1 wherein said pole is detachable from said receptacle.

8. A fruit picking device as set forth in claim 7 including a plurality of interchangeable receptacles.

* * * * *